(12) United States Patent
Toye, IV

(10) Patent No.: US 6,603,229 B1
(45) Date of Patent: Aug. 5, 2003

(54) LINEAR ACTUATOR WITH THREADED CAPTIVATION SLEEVE, CAPTIVE LEAD SCREW, AND SPRING PRE-LOAD ADJUSTMENT

(75) Inventor: Thomas A. Toye, IV, Meriden, CT (US)

(73) Assignee: Tri-Tech, Inc., Waterbury, CT (US)

( * ) Notice: Subject to any disclaimer, the term of this patent is extended or adjusted under 35 U.S.C. 154(b) by 0 days.

(21) Appl. No.: 09/713,083

(22) Filed: Nov. 15, 2000

(51) Int. Cl.[7] .............................. H02K 5/16; H02K 7/08; H02K 7/06; H02K 7/10; H02K 37/00; H02K 41/00; H02K 33/00; H02K 35/00

(52) U.S. Cl. .......................... 310/90; 310/83; 310/80; 310/49 R; 310/15; 310/12; 128/205.24; 251/129.11

(58) Field of Search ............................. 310/90, 15, 12, 310/49 R, 80, 83; 128/205.24; 251/129.11

(56) References Cited

U.S. PATENT DOCUMENTS

| | | | | |
|---|---|---|---|---|
| 1,773,427 A | * | 8/1930 | Larsh | 310/75 R |
| 2,444,886 A | * | 7/1948 | Vickers | 74/89.39 |
| 2,446,393 A | * | 8/1948 | Russell | 318/675 |
| 2,455,368 A | * | 12/1948 | Hoffar | 74/424.86 |
| 2,956,188 A | * | 10/1960 | White | 310/86 |
| 4,032,163 A | * | 6/1977 | Holt | 279/118 |
| 4,274,444 A | * | 6/1981 | Ruyak | 137/630.14 |
| 4,382,578 A | * | 5/1983 | Ruyak | 251/65 |
| 4,457,196 A | * | 7/1984 | Cady | 83/140 |
| 4,491,443 A | * | 1/1985 | DeCaro | 279/14 |
| 4,561,811 A | * | 12/1985 | Womack | 279/79 |
| 4,751,411 A | * | 6/1988 | Fukaya et al. | 310/49 R |
| 4,908,922 A | * | 3/1990 | Abe | 264/229 |
| 4,911,404 A | * | 3/1990 | Dorste et al. | 251/129.08 |
| 5,351,935 A | * | 10/1994 | Miyoshi et al. | 251/129.11 |
| 5,467,661 A | * | 11/1995 | Lange | 74/441 |
| 5,467,662 A | * | 11/1995 | Lange et al. | 74/424.83 |
| 5,537,275 A | * | 7/1996 | Peace et al. | 360/261.3 |
| 5,718,259 A | * | 2/1998 | Miyake et al. | 137/338 |
| 5,747,903 A | * | 5/1998 | Klingler | 310/75 R |
| 5,899,114 A | * | 5/1999 | Dolata et al. | 74/424.85 |
| 6,157,103 A | * | 12/2000 | Ohta et al. | 310/49 R |
| 6,317,287 B1 | * | 11/2001 | Yano et al. | 310/12 |
| 6,453,761 B1 | * | 9/2002 | Babinski | 74/89.34 |
| 6,484,720 B1 | * | 11/2002 | Marquard et al. | 128/205.24 |
| 6,494,120 B1 | * | 12/2002 | Barbulescu et al. | 81/57.42 |

* cited by examiner

Primary Examiner—Nestor Ramirez
Assistant Examiner—Pedro J. Cuevas
(74) Attorney, Agent, or Firm—John H. Crozier

(57) ABSTRACT

In a preferred embodiment, a linear actuator, including: front and rear end bells; a stator structure; a rotor structure having first and second bearings journaled, respectively, in cavities formed in inner surfaces of the front and rear end bells; a captivation sleeve having its proximal end threadedly inserted in a cavity formed in an outer surface of the front end bell; and all foregoing elements being coaxially aligned to permit the insertion therethrough of a lead screw.

10 Claims, 4 Drawing Sheets

LINEAR ACTUATOR WITH THREADED CAPTIVATION SLEEVE, CAPTIVE LEAD SCREW, AND SPRING PRE-LOAD ADJUSTMENT

BACKGROUND OF THE INVENTION

1. Field of the Invention

The present invention relates to motors generally and, more particularly, but not by way of limitation, to a novel linear actuator having a captivated lead screw and bearing pre-load adjustment.

2. Background Art

A linear actuator is a device used to perform operation along a linear path. One possible configuration of a linear actuator is one in which rotary motion is translated into linear motion by passing a lead screw through the threaded rotor of a rotary electric motor. In doing so, it is necessary to provide means to prevent rotation of the lead screw. This can be achieved using either external constraints or constraints internal to the actuator through captivation. The latter requires no external anti-rotation techniques.

Captive linear actuators provide anti-rotation by fastening anti-rotation shafts to the lead screw and passing this shaft through a bearing. The bearing is typically constrained with a sleeve mounted to a motor face. The shaft and bearing can be any configuration that allows linear translation without rotation of the shaft. Examples of this are splined, hexagonal, or butterfly shafts, etc. In motor applications using ball bearings for rotor rotation efficiency, it is necessary to pre-load the ball bearing between the inner and outer bearing race.

Accordingly, it is a principal object of the present invention to provide a linear motor with an internally captivated lead screw.

It is a further object of the invention to provide such a linear motor in which the pre-load of the ball bearings thereof is adjustable.

It is another object of the invention to provide such a linear motor that is economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a linear actuator, comprising: front and rear end bells; a stator structure; a rotor structure having first and second bearings journaled, respectively, in cavities formed in inner surfaces of said front and rear end bells; a captivation sleeve having its proximal end threadedly inserted in a cavity formed in an outer surface of said front end bell; and all foregoing elements being coaxially aligned to permit the insertion therethrough of a lead screw.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
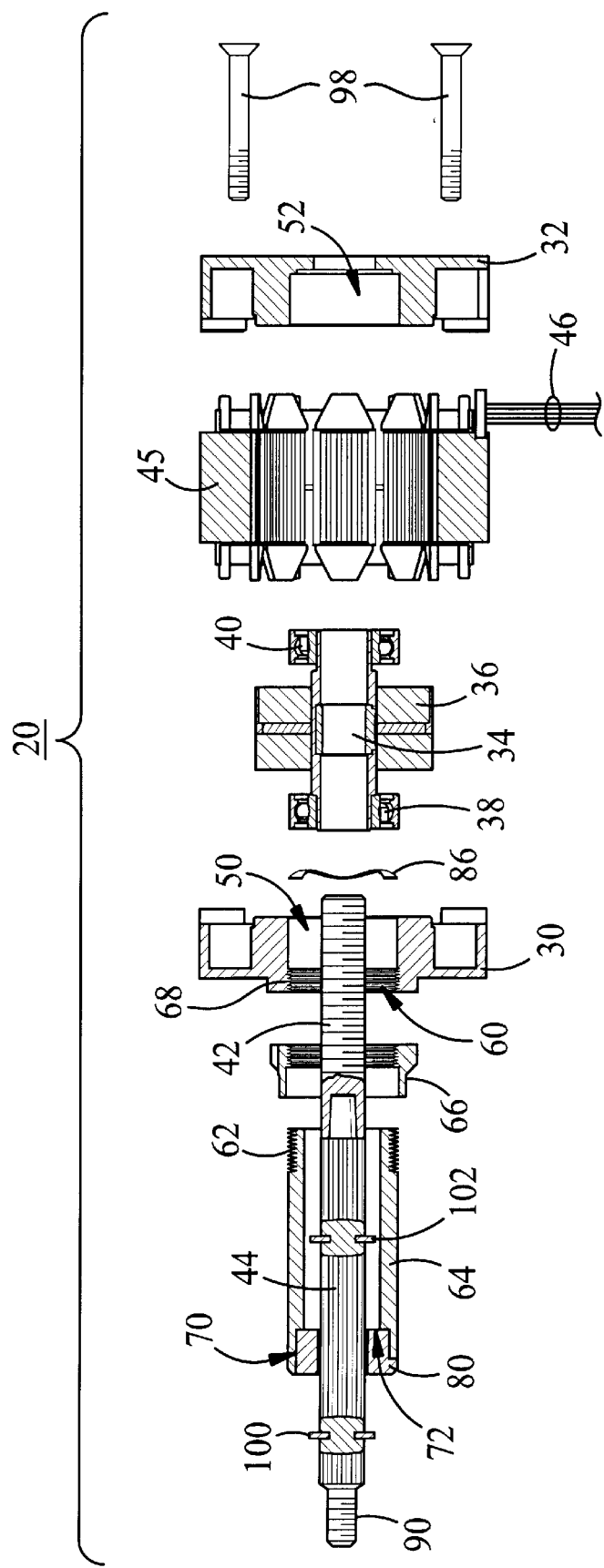
FIG. 1 is an exploded, side elevational view, partially in cross-section, of a linear actuator constructed according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 2:
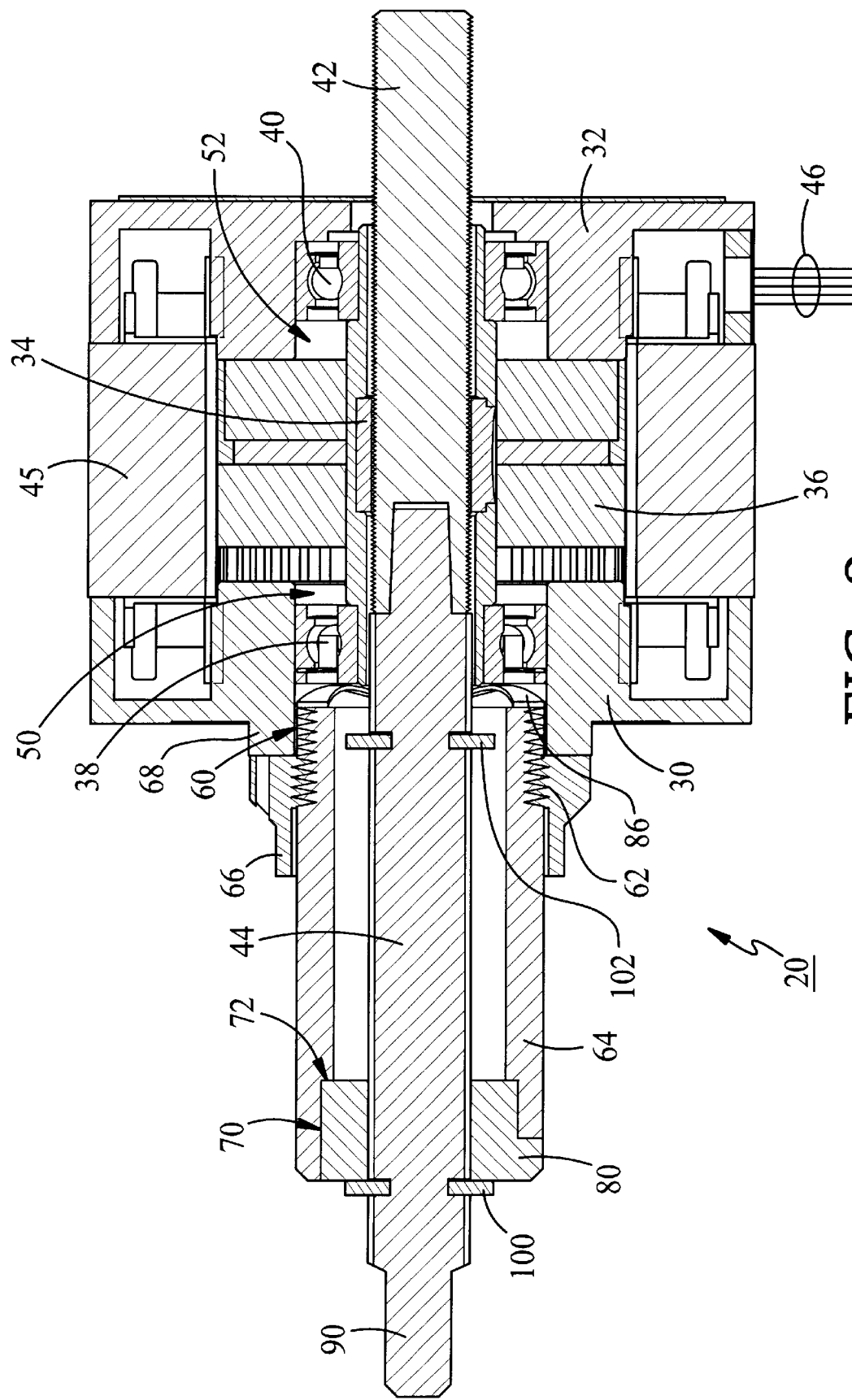
FIG. 2 is a cross-sectional side elevational view of the assembled linear actuator.
Figure 3:
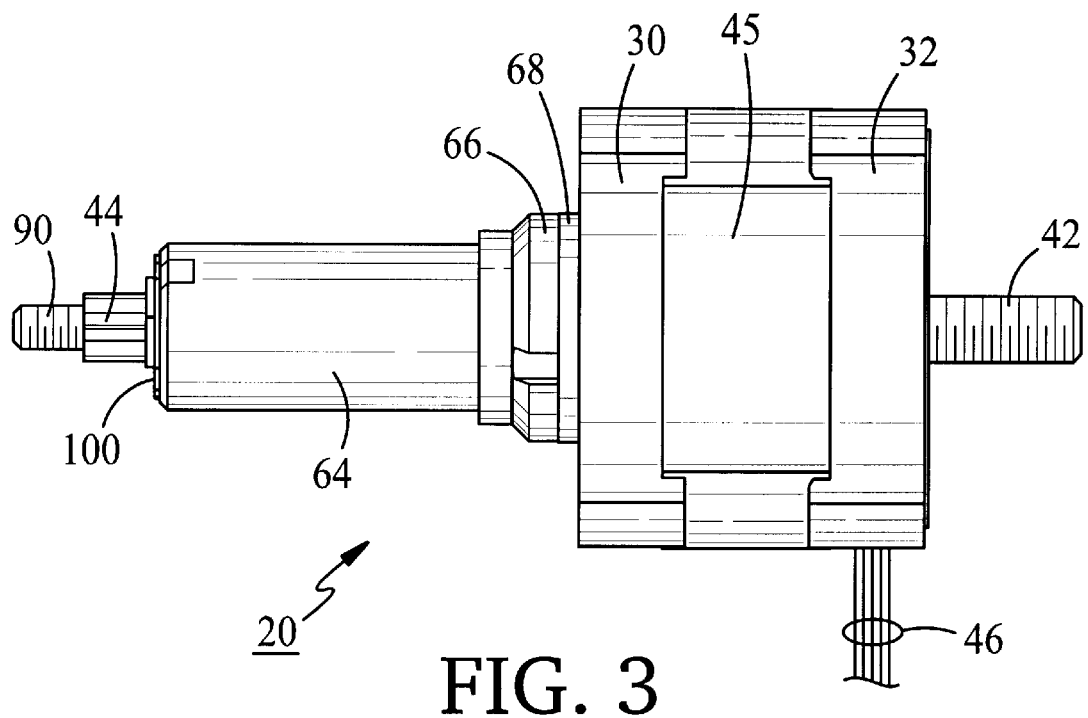
FIG. 3 is a side elevational view of the assembled linear actuator.

FIGS. 1–3 illustrate the elements of a linear actuator, in this case an electric motor, constructed according to the present invention, and generally indicated by the reference numeral 20. Motor 20 may be assumed to be a rotary hybrid stepper motor, incorporating both variable reluctance and permanent magnet motor characteristics. Motor 20 includes front and rear end bells 30 and 32, respectively, a rotor assembly 34, the latter having a permanent magnet structure 36 and first and second cylindrical ball bearing assemblies 38 and 40, respectively, mounted on a shaft having a threaded portion 42 and a splined portion 44, and a stator structure 45 surrounding the permanent magnet structure, all the foregoing elements being coaxially aligned. Lead wires 46 extend from stator structure 45. When motor 20 is assembled (FIG. 2), first and second ball bearings 38 and 40 will be journaled, respectively, in inner cavities 50 and 52 provided, respectively, in front and rear end bells 30 and 32.

Threaded portion 42 is extendable through front and rear end bells 30 and 32 and the inner surface of rotor assembly 34 is threaded complementarily with the outer surface of the threaded portion.

Front end bell 30 includes an outer cavity 60 having its surface threaded so as to accept therein a threaded outer surface 62 of the proximal end of a cylindrical capitivation sleeve 64. A spanner nut 66 disposed on threaded outer surface 62 bears against a cylindrical shoulder 68 formed on the front surface of front end bell 30 and secures captivation sleeve 64 in place. Formed at the distal end of captivation sleeve 64 is a cavity 70 having a shoulder 72 formed at the base thereof for the insertion into the cavity of an anti-rotation bearing 80 (FIG. 2). One or more optional spring washers 86 are disposed between the outer end of first ball bearing 38 and the proximal end of captivation sleeve 64. Again, all the foregoing elements of motor 20, except of course lead wires 46, are coaxially aligned.

Screwing captivation sleeve 64 into front end bell 30 against the outer surface of first ball bearing 38 permits first and second ball bearings 38 and 40 to be pre-loaded to a desired degree. This arrangement allows the pre-load to be adjusted after assembly of motor 20 and can even be achieved in the field, by changing the degree of torque of captivation sleeve 64 as it is threaded into cavity 60. Spring washer(s) 86 may be provided to accommodate tolerances.

This arrangement also permits the strength of spring washer(s) 86, when used, and/or the degree of torque of captivation sleeve 64 to be changed for a particular motor 20 during manufacture, so that different degrees of pre-load can be obtained in a single motor size. The length of captivation sleeve 64 is determined by the desired stroke actuation of the lead screw which can easily be changed.

The distal end of splined portion 44 has a threaded section 90 extending therefrom. This is provided for attachment to an apparatus (not shown) with which motor 20 may be used, although such is not part of the present invention and other attachment means may be employed as well.

Splined portion 44 has, respectively, external and internal stops 100 and 102 fixedly attached thereto to limit the degree of travel of splined portion 44 and, concomitantly, threaded portion 42.

Machine screws 98 (FIG. 1) extend through end bells 30 and 32 and stator structure 45 to secure together those elements of motor 20.

Figure 4:
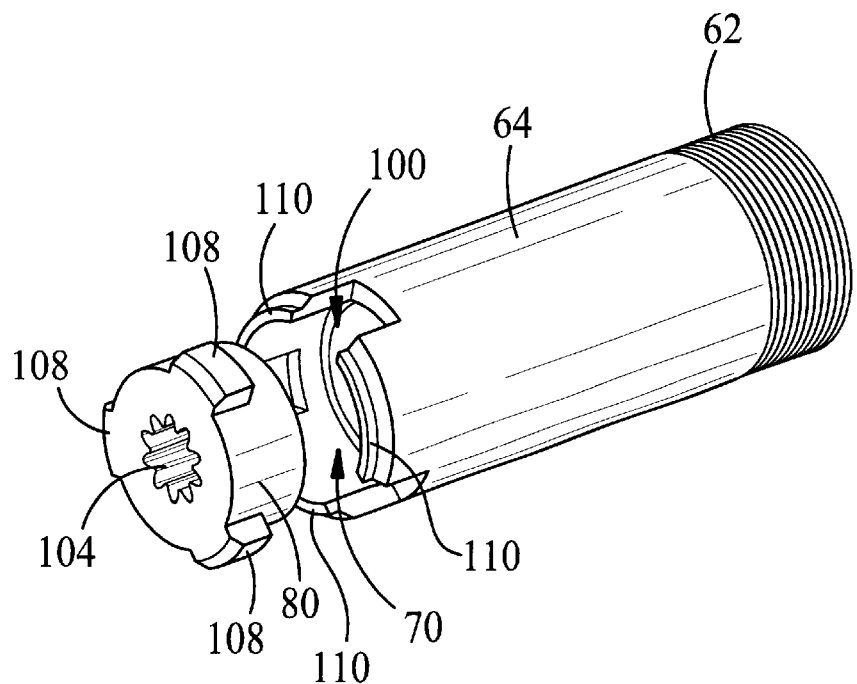
FIG. 4 is an exploded, isometric view of the captivation sleeve and anti-rotation bearing for the linear actuator.

FIG. 4 illustrates in more detail the construction of the distal end of captivation sleeve 64 and anti-rotation bearing 80. The inner surface of anti-rotation bearing 80 has an involute splined surface 104 complementary to that of the outer surface of splined portion 44 (FIGS. 1–3) to prevent rotation of splined portion 44 and, concomitantly, threaded portion 42.

The distal end of captivation sleeve 64 has three, equally spaced apart slots, as at 100, formed therein to closely engage anti-rotation tabs 108 formed on the outer surface of anti-rotation bearing 80 when the anti-rotation bearing is inserted into cavity 70 to prevent the anti-rotation bearing from rotating with respect to the captivation sleeve. Also formed on the distal end of captivation sleeve 64 are three, equally spaced locking tabs, as at 110, the function of which is described below.

Figure 5:
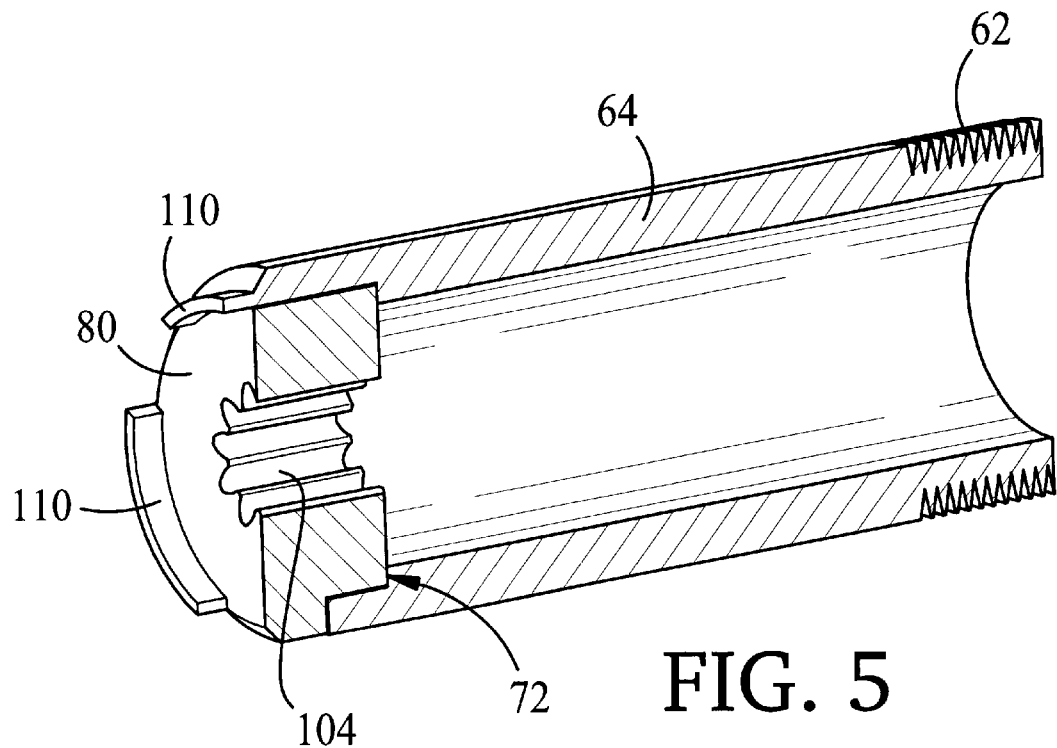
FIG. 5 is a cross-sectional, isometric view of the captivation sleeve with the anti-rotation bearing inserted therein, but before rolling of the tabs of the sleeve.

FIG. 5 illustrates anti-rotation bearing 80 inserted into the distal end of captivation sleeve 64 and shows that the inner surface of the anti-rotation bearing bottoms out against shoulder 72.

Figure 6:
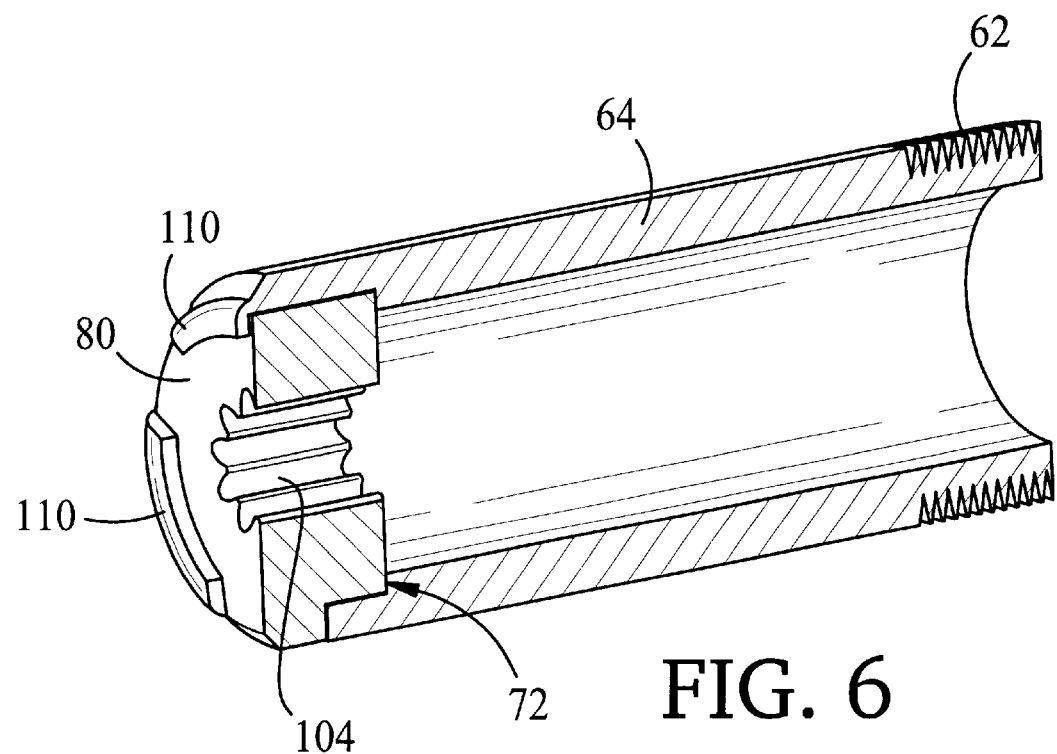
FIG. 6 is a cross-sectional, isometric view of the sleeve of the present invention with locking tabs rolled over the anti-rotation bearing.

FIG. 6 is the same as FIG. 5, except that locking tabs 110 have been bent over the outer surface of anti-rotation bearing 80 by a rolling process to securely and fixedly hold the anti-rotation bearing in place in the distal end of captivation sleeve 64.

The use of anti-rotation tabs 108 (FIGS. 5 and 6) and locking tabs 110 is very economical. Anti-rotation tabs 102 may be formed integrally with anti-rotation bearing 80 in a thermoplastic molding operation. Captivation sleeve 64 is preferably formed of aluminum. The other components of motor 20 can be formed of any suitable, conventional materials.

It will be understood that anti-rotation bearing 80 prevents splined portion 44 from rotating, while rotation of threaded portion 42, due to the engagement of the threaded inner surface of rotor assembly 34 with the threaded outer surface of threaded portion 42, will cause the splined portion to move out of the distal end of captivation sleeve 64 or to move into the distal end of the captivation sleeve as the rotor structure is caused to selectively rotate one direction or the other.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", "horizontal", "vertical", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A linear actuator, comprising:
   (a) front and rear end bells;
   (b) a stator structure;
   (c) a rotor structure having first and second bearings journaled, respectively, in cavities formed in inner surfaces of said front and rear end bells;
   (d) a captivation sleeve having its proximal end threadedly inserted in a cavity formed in an outer surface of said front end bell;
   (e) all foregoing elements being coaxially aligned to permit the insertion therethrough of a lead screw inserted through coaxially aligned foregoing elements, said lead screw having a threaded portion extending through said rotor structure and a splined portion extending through said captivation sleeve; and
   (f) a cylindrical anti-rotation bearing fixedly inserted in a distal end of said captivation sleeve, said anti-rotation bearing having an opening coaxial with said foregoing elements.

2. A linear actuator, as defined in claim 1, wherein: said proximal end of said captivation sleeve bears against an outer surface of said first bearing to impose a selected pre-load on said first and second bearings by selectively threadedly rotating said captivation sleeve inwardly or outwardly.

3. A linear actuator, as defined in claim 1, further comprising: a spring disposed between an outer surface of said first bearing and said proximal end of said captivation sleeve such that pre-load of said first and second bearings is determined by strength of said spring and degree of compression of said spring by said proximal end of said captivation sleeve being inserted into said cavity formed in an outer surface of said front end bell.

4. A linear actuator, as defined in claim 1, wherein:
   (a) said anti-rotation bearing has anti-rotation tabs molded integrally therewith; and
   (b) said captivation sleeve has slots formed in said distal end thereof into which sleeve said anti-rotation tabs closely fit to prevent rotation of said anti-rotation bearing with respect to said captivation sleeve.

5. A linear actuator, as defined in claim 1, wherein: said captivation sleeve has locking tabs formed in said distal end thereof and bent over an outer surface of said anti-rotation bearing to lock said anti-rotation bearing axially and radially in place in said captivation sleeve.

6. A linear actuator, comprising:

(a) front and rear end bells;

(b) a stator structure;

(c) a rotor structure having first and second bearings journaled, respectively, in cavities formed in inner surfaces of said front and rear end bells;

(d) a captivation sleeve having its proximal end threadedly inserted in a cavity formed in an outer surface of said front end bell;

(e) a lead screw inserted through coaxially aligned foregoing elements, said lead screw having a threaded portion extending through said rotor structure and a splined portion extending through said captivation sleeve; and (f) a cylindrical anti-rotation bearing fixedly inserted in a distal end of said captivation sleeve, said anti-rotation bearing having an opening coaxial with said foregoing elements.

7. A linear actuator, as defined in claim 6, wherein: said proximal end of said captivation sleeve bears against an outer surface of said first bearing to impose a selected pre-load on said first and second bearings by selectively threadedly rotating said captivation sleeve inwardly or outwardly.

8. A linear actuator, as defined in claim 7, further comprising: a spring disposed between an outer surface of said first bearing and said proximal end of said captivation sleeve such that pre-load of said first and second bearings is determined by strength of said spring and degree of compression of said spring by said proximal end of said captivation sleeve being inserted into said cavity formed in an outer surface of said front end bell.

9. A linear actuator, as defined in claim 7, wherein:

(a) said anti-rotation bearing has anti-rotation tabs molded integrally therewith; and (b) said captivation sleeve has slots formed in said distal end thereof into which sleeve said anti-rotation tabs closely fit to prevent rotation of said anti-rotation bearing with respect to said captivation sleeve.

10. A linear actuator, as defined in claim 7, wherein: said captivation sleeve has locking tabs formed in said distal end thereof and bent over an outer surface of said anti-rotation bearing to lock said anti-rotation bearing axially and radially in place in said captivation sleeve.

* * * * *

UNITED STATES PATENT AND TRADEMARK OFFICE
CERTIFICATE OF CORRECTION

PATENT NO. : 6,603,229 B1
DATED : August 5, 2003
INVENTOR(S) : Thomas A. Toye, IV It is certified that error appears in the above-identified patent and that said Letters Patent is hereby corrected as shown below:

<u>Column 6,</u>
Lines 1-20, claims 8, 9, and 10 depend from claim 6.

Signed and Sealed this

Twenty-fifth Day of May, 2004

JON W. DUDAS
*Acting Director of the United States Patent and Trademark Office*